United States Patent
Gomaa et al.

(10) Patent No.: US 11,414,593 B2
(45) Date of Patent: Aug. 16, 2022

(54) ACIDIZING OF SUBTERRANEAN FORMATION USING IN-SITU GENERATED HF

(71) Applicant: King Fahd University of Petroleum and Minerals, Dhahran (SA)

(72) Inventors: Ibrahim Gomaa, Dhahran (SA); Mohamed Mahmoud, Dhahran (SA); Khaled Zidan Abdelgawad, Dhahran (SA); Amjed Hasan, Dhahran (SA); Dhafer Al-Shehri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 199 days.

(21) Appl. No.: 16/560,501

(22) Filed: Sep. 4, 2019

(65) Prior Publication Data

US 2021/0062073 A1 Mar. 4, 2021

(51) Int. Cl.
*C09K 8/74* (2006.01)

(52) U.S. Cl.
CPC ..................... *C09K 8/74* (2013.01)

(58) Field of Classification Search
CPC ...................................... E21B 43/27
See application file for complete search history.

(56) References Cited

U.S. PATENT DOCUMENTS

| | | | |
|---|---|---|---|
| 4,136,739 A | | 1/1979 | Salathiel et al. |
| 4,482,016 A | * | 11/1984 | Richardson .............. C09K 8/72 166/300 |
| 7,704,927 B2 | | 4/2010 | Qu et al. |
| 2017/0275498 A1 | * | 9/2017 | Tamada ................ C09K 3/1463 |
| 2018/0274348 A1 | * | 9/2018 | Karale ................ E21B 43/2405 |
| 2018/0291720 A1 | * | 10/2018 | Cairns ................... E21B 43/283 |

FOREIGN PATENT DOCUMENTS

WO 00/70186 11/2000

OTHER PUBLICATIONS

Sokhanvarian, et al. ; A New In-Situ Generated Acid System for Carbonate Dissolution in Sandstone and Carbonate Reservoirs ; SPE International Conference on Oilfield Chemistry ; Apr. 3-5, 2017 ; 2 Pages.
Hull, et al. ; Bromate Oxidation of Ammonium Salts: In Situ Acid Formation for Reservoir Stimulation ; Inorganic Chemistry 58 ; pp. 3007-3014 ; 2019 ; 8 Pages.

* cited by examiner

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

A method for generating hydrofluoric acid (HF) in-situ in a subterranean formation (e.g. sandstone formation) by simultaneously injecting an acid generating component having ammonium fluoride and an oxidizing agent and a heat generating component having ammonium and nitrite salts into a wellbore of the formation. The method optionally involves a pre-flush of an acid (e.g. HCl) containing solution prior to the injecting. HF is generated via an endothermic reaction of the ammonium fluoride and the oxidizing agent with the assistance of the heat provided by an exothermic reaction of the ammonium and nitrite salts. The method is effective in enhancing permeability of the formation by at least 30%.

11 Claims, 5 Drawing Sheets

ACIDIZING OF SUBTERRANEAN FORMATION USING IN-SITU GENERATED HF

BACKGROUND OF THE INVENTION

Technical Field

The present disclosure relates to a method of acidizing a geologic formation employing in-situ generated hydrofluoric acid (i.e. hydrogen fluoride, HF). In one aspect HF can be produced within the formation by injecting a heating generating component including an ammonia salt, a nitrite salt, an acid generating component including ammonium fluoride and an oxidizing agent concurrently into a wellbore in the geologic formation. In another aspect the method may additionally include pre-flushing the wellbore with an acid such as hydrochloric acid (HCl) before the injecting.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional acid treatment of sandstone formations involves a pre-flush with 15 wt. % HCl followed by the use of mud acid (e.g. 12 wt. % HCl and 3 wt. % HF mixture). However, application of mud acid mixture has many drawbacks. Thomas et al., (2001) illustrates that flooding cores containing clays such as chlorite and illite with HCl would damage the core due to precipitation of reaction byproducts and/or fines migration [Thomas, R L, Nasr-El-Din, H A, Lynn, J D, Mehta, S, and Zaidi, S R. Precipitation During the Acidizing of a HT/HP Illitic Sandstone Reservoir in Eastern Saudi Arabia: A Laboratory Study. Paper SPE 71690 presented at the Annual Technical Conference and, New Orleans, La., 30 Sep.-3 Oct. 2001—incorporated herein by reference]. Moreover, HCl attacks chlorite and illite and produces amorphous silica residue [Simon, D E and Anderson, M S. Stability of Clay Minerals in Acid. Paper SPE 19422 presented at the SPE Formation Damage Control Symposium, Lafayette, La., USA, 22-23 Feb. 1990; and Labrid, J C. Thermodynamic and Kinetic Aspects of Argillaceous Sandstone Acidizing. *SPE Journal Vol.* 15 no. 2, pp. 117-128, 1975—each incorporated herein by reference]. Ali et al. [Ali, A H A, Frenier, W, Xiao, Z and Ziauddin, M. Chelating Agent-Based Fluids for Optimal Stimulation of High-Temperature Wells. Paper SPE 77366 presented at the SPE Annual Technical Conference and Exhibition, San Antonio, Tex., 29 Sep.-2 Oct. 2002—incorporated herein by reference] claims that the reaction of clay with HCl can accelerate at high temperatures.

Hydrofluoric acid (HF) can dissolve feldspar, carbonates, clays, and quartz. HF is primarily applied to remove silica and silicates. Solubility of clay minerals in HF acid depends on the concentration of HF, length of reaction period, and reaction temperature. Secondary reactions between clays and HF occur at elevated temperatures, which lead to decreased Si/Al ratios.

The reaction of fluosilic acid (the reaction product of HF and silicates) with cations present in formation brine produces precipitants including $CaSiF_6$, $Na_2SiF_6$, and $K_2SiF_6$ [Al-Shaalan, T M and Nasr-El-Din, H A. Mathematical Modeling of Sandstone Stimulation: A Critical Review of Available Models. Paper NACE-00443 presented at CORROSION 2000, 26-31 March, Orlando, Fla., 2000; and Mahmoud, M A, Nasr-El-Din, H A, and De wolf, C A. High-Temperature Laboratory Testing of Illitic Sandstone Outcrop Cores with HCl-Alternative Fluids. SPE Production & Operations Journal. Vol. 30, no. 1, pp. 43-51, 2015, each incorporated herein by reference in their entirety]:

$$SiF_6^{-2} + Ca^{+2} \rightarrow CaSiF_6 \tag{1}$$

$$SiF_6^{-2} + 2Na^+ \rightarrow Na_2SiF_6 \tag{2}$$

$$SiF_6^{-2} + 2K^+ \rightarrow K_2SiF_6 \tag{3}$$

HF reacts more readily than HCl for sandstone acidizing. The primary chemical reaction between HF and aluminosilicates in Berea sandstone can be expressed as follows [Gdanski, R. Kinetics of the Primary Reaction of HF on Alumino-Silicate. Paper SPE 37459 presented at the SPE Production Operations Symposium, Oklahoma City, USA, 9-11 Mar. 1997, incorporated herein by reference in its entirety]:

$$(5+X)HF + M-Al-Si + (3-X+1)H^+ \rightarrow HSiF_5 + AlF_x^{(3-X)+} + M^+ + H_2O \tag{4}$$

where x is the average F/Al ratio, and $M^+$ stands for cations such as $K^+$ and $Na^+$.

The secondary reaction of $HSiF_5$ with aluminosilicates can be written as:

$$\frac{X}{5}HSiF_5 + M - Al - Si + (2 - X + 1)H^+ + H_2O \rightarrow AlF_x^{(3-X)+} + M^+ + \text{Silica Gel} \tag{5}$$

The tertiary reaction occurs when aluminum fluoride complexes react with clay, which also produces precipitation of silica gel:

$$yAlF_x^{(3-X)+} + (X-y) - Al - Si + 3(X+y)H^+ AlF_x^{(3-X)+} + \rightarrow XAlF_y^{(3-y)+} + (X-y)\text{Silica Gel} \tag{6}$$

where y is the fluoride number coordinated with aluminum after the tertiary reaction, and y<x.

The reaction of hydrofluoric acid and $CaCO_3$ forms $CaF_2$ as a precipitate, as shown in the following equation:

$$2HF + CaCO_3 \rightarrow CaF_2 + H_2O + CO_2 \tag{7}$$

In order to avoid $CaF_2$ precipitation, carbonates should not expose to HF [Al-Shaalan, T M and Nasr-EI-Din, H A. Mathematical Modeling of Sandstone Stimulation: A Critical Review of Available Models. Paper NACE-00443 presented at CORROSION 2000, 26-31 March, Orlando, Fla., 2000, incorporated herein by reference in its entirety].

Retarded acids have been introduced to remove deep damages in sandstone formations. Kunze et al., [Kunze, K R and Shaughnessy, C M. Acidizing Sandstone Formations with Fluoboric Acid. SPE Journal Vol 23, no. 1, pp 65-72, 1983, incorporated herein by reference in its entirety] and Jaramillo et al. [Jaramillo, O J, Romero, R, Ortega, A, Milne, A, and Lastre, M. Matrix Acid Systems for Formations with High Clay Content. Paper SPE 126719 presented in the SPE International Symposium and Exhibition on Formation Damage Control, Lafayette, La., USA, 10-12 Feb. 2010, incorporated herein by reference in its entirety] use fluoboric acid ($HBF_4$) as an alternative stimulation fluid that lowers the reaction rate with clays at high temperature [8-2]. Al-Anazi et al. [Al-Anazi, H A, Nasr-El-Din, H A, Hashem, M K, and Hopkins, J K. Matrix Acidizing of Water Injectors in a Sandstone Field in Saudi Arabia: A Case Study. Paper SPE 62825 presented in the SPE/AAPG Western Regional Meeting, California, USA, 19-22 Jun. 2000, incorporated herein by reference in its entirety] employs retarded HF acid (RHF) to stimulate sandstone water injector wells. Nevertheless, retarded acids encounter similar problems [Al-Anazi, H A, Nasr-El-Din, H A, Hashem, M K, and Hopkins, J K. Matrix Acidizing of Water Injectors in a Sandstone Field in Saudi Arabia: A Case Study. Paper SPE 62825 presented in the SPE/AAPG Western Regional Meeting, California, USA, 19-22 Jun. 2000, incorporated herein by reference in its entirety].

Organic acids that have low corrosion and reaction rates have been tested to acidize sandstone formations containing HCl-sensitive clays. Organic acids such as acetic, citric, and formic acids have been combined with HCl, HF, and/or fluoboric acid to acidize sandstone cores [Shafiq, M U and Shuker, M T. Finding Suitable Acid for Acidizing of Low Permeable Sandstone Formation: A Research. Paper SPE 169641 presented at the SPE/PAPG Annual Technical Conference, Islamabad, Pakistan, 26-27 Nov. 2013; Yang, F, Nasr-El-Din, H A, and AL-Harbi, B. Acidizing Sandstone Reservoirs Using HF and Formic Acids. Paper SPE 150899 presented at the SPE International Symposium and Exhibition on Formation Damage Control, Lafayette, La., USA, 15-17 Feb. 2012; Al-Harbi, B G, Al-Dahlan, M N, Al-Khaldi, M H, Al-Harith, M A, and Abadi, A K. Evaluation of organic-hydrofluoric acid mixtures for sandstone acidizing. Paper IPTC 16967 presented at the International Petroleum Technical Conference, Beijing, China, 26-28 Mar. 2013; and Al-Harbi, B G, Al-Dahlan, and M N, Al-Khaldi. Aluminum and Iron Precipitation During Sandstone Acidizing Organic-HF Acids. Paper SPE 151781 presented at the SPE International Symposium and Exhibition on Formation Damage Control, Lafayette, La., USA, 15-17 Feb. 2012, each incorporated herein by reference in their entirety]. In general, organic acid-HF systems react with sand and clays more slowly than does mud acid (HF/HCl). The reaction rate is dependent on the type of the organic acid, organic acid to HF ratio, as well as reaction temperature. For example, the reaction rate may increase significantly when the temperature goes beyond 122° F. However, severe formation damage due to precipitation of $AlF_3$ is reported upon acidizing chlorite clays with different organic-HF acids [Fredd, C N and Fogler, H S. Chelating Agents as Effective Matrix Stimulation Fluids for carbonate Formations. Paper SPE 37212 presented at the SPE International Symposium on Oil Field Chemistry, Houston, Tex., USA, 18-21 Feb. 1997, incorporated herein by reference in its entirety].

Chelating agents have been widely used in oil industry for controlling precipitation of ferric and ferrous hydroxide, for scale removal, and as stand-alone stimulation fluids [W. W. Fernier, D. Wilson, D. Crump and L. Jones, "Use of Highly Acid-Soluble Chelating Agents in Well Stimulation Services." In *proceeding of the SPE Annual Technical Conference and Exhibition*, SPE 63242, Dallas, Tex., USA, October 2000; Reyes, E A, Smith, A L, and Beaturbaugh, A. Properties and Applications of an Alternative Aminopolycarboxylic Acid for Acidizing Sandstones and Carbonates. Paper SPE 165142 presented at SPE European Formation Damage Conference & Exhibition, Noordwijk, Netherlands, 5-7 Jun. 2013; and Sokhanvarian, K, Nasr-El-Din, H A, Wang, G, and De Wolf, C A. Thermal Stability of Various Chelates That Are Used in The Oilfield And Potential Damage Due To Their Decomposition Products. Paper SPE 157426 presented at the SPE international Production and Operations Conference and Exhibition, Doha, Qatar, 14-16 May 2014, each incorporated herein by reference in their entirety]. Mahmoud et al. [Mahmoud, M A, Nasr-El-Din, H A, and De wolf, C A. High-Temperature Laboratory Testing of Illitic Sandstone Outcrop Cores with HCl-Alternative Fluids. SPE Production & Operations Journal. Vol. 30, no. 1, pp. 43-51, 2015, incorporated herein by reference in its entirety] stimulate sandstone cores using EDTA, HEDTA, and GLDA. Coreflooding experiments are conducted on sandstone cores having illite content at up to 18 wt. % at 300° F. Severe damage is observed when 15 wt. % HCl is applied to sandstone cores with different illite contents. CT scan and permeability measurements indicate that GLDA performed better than HEDTA and EDTA at pH of 4 [Mahmoud, M A, Nasr-El-Din, H A, and De wolf, C A. High-Temperature Laboratory Testing of Illitic Sandstone Outcrop Cores with HCl-Alternative Fluids. SPE Production & Operations Journal. Vol. 30, no. 1, pp. 43-51, 2015, incorporated herein by reference in its entirety]. Sokhanvarian et al. [Al Dahlan, M N, Al-Harbi, B G, and Al-Khaldi, M H. Evaluation of Chelating-Hydrofluoric Systems. Paper IPTC 16969 presented at the International Petroleum Technology Conference, Beijing, china, 26-28 Mar. 2013, incorporated herein by reference in its entirety] studies the thermal stability of various chelating agents and they found that GLDA, EDTA, HEDTA, and DTPA chelating agents are thermally stable at up to 350° F. at pH level of less than 4. At higher pH levels (e.g. pH greater than 10), these chelating agents are stable even at temperatures beyond 400° F.

Mahmoud et al. [Mahmoud, M A, Nasr-El-Din, H A, and De wolf, C A. High-Temperature Laboratory Testing of Illitic Sandstone Outcrop Cores with HCl-Alternative Fluids. SPE Production & Operations Journal. Vol. 30, no. 1, pp. 43-51, 2015, incorporated herein by reference in its entirety] uses 20 wt. % GLDA combined with 1 wt. % HF acid to stimulate various sandstone cores. Computed tomography scans show a reduction in the CT-number value due to precipitation of $CaF_2$. Al Dahlan et al. [Al Dahlan, M N, Al-Harbi, B G, and Al-Khaldi, M H. Evaluation of Chelating-Hydrofluoric Systems. Paper IPTC 16969 presented at the International Petroleum Technology Conference, Beijing, china, 26-28 Mar. 2013, incorporated herein by reference in its entirety] use solutions containing EDTA and ammonium bi-fluoride (ABF) at concentrations of 0.5 and 1 wt. %, respectively to stimulate sandstone cores. They discover that the amount of $AlF_3$ precipitated correlates to Al/F ratio in the solution. Li et al. [Li, N, Zhang, Q, Wang, Y, Liu, P, and Zhao, L. A New Multichelating Acid System for High-Temperature Sandstone Reservoirs. Journal of Chemistry, vol. 2015, Article ID 594913, 9 pages, 2015, incorporated herein by reference in its entirety] introduce an acid system that contains a combination of chelating agents, phosphoric acid, and $NH_4F$ for stimulating sandstone reservoirs at elevated temperature. The acid system shows low corrosion rate and limited degree of $CaF_2$ precipitation.

Therefore, a need exists for methods and compositions which allow in-situ HF acid generation to effectively acidize formations (e.g. sandstone formations) and enable efficient production of hydrocarbons from such formations.

In view of the forgoing, one objective of the present disclosure is to provide a method of acidizing a subterranean geological formation by injecting a heat generating component (i.e. ammonium and nitrite salts) and an acid generating component (i.e. ammonium fluoride and an oxidizing agent) simultaneously into a wellbore within the formation. Hydrogen fluoride can be generated via an endothermic reaction of ammonium fluoride and the oxidizing agent. The heat required by the endothermic reaction may be provided by an exothermic reaction of the ammonium and nitrite salts.

BRIEF SUMMARY OF THE INVENTION

According to a first aspect, the present disclosure relates to a method of acidizing a subterranean formation surrounding a wellbore. The method involves injecting an acid generating component and a heat generating component simultaneously into the wellbore, wherein (i) the acid generating component comprises a first aqueous solution comprising ammonium fluoride, and a second aqueous solution comprising an oxidizing agent, (ii) the heat generating component comprises a third aqueous solution comprising an ammonium salt that is not ammonium fluoride, and a fourth aqueous solution comprising a nitrite salt, (iii) a molar ratio of ammonium fluoride to the oxidizing agent is in a range of 1:1 to 8:1, (iv) a molar ratio of ammonium ions present in the ammonium salt to the nitrite ions present in the nitrite salt is in a range of 1:4 to 4:1, and (v) a molar ratio of the ammonium fluoride to the nitrite salt is in a range of 1:1 to 10:1. The ammonium salt reacts with the nitrite salt to release heat and nitrogen gas, and the heat initiates a reaction between ammonium fluoride and the oxidizing agent, thereby forming hydrogen fluoride within the subterranean formation.

In one embodiment, the method further involves flushing an aqueous solution comprising an acid into the wellbore prior to the injecting.

In a further embodiment, the acid is hydrochloric acid.

In one embodiment, the oxidizing agent is at least one selected from the group consisting of an alkali metal bromate, an alkali metal chlorate, an alkali metal iodate, an alkali metal bromite, an alkali metal chlorite, and an alkali metal hypochlorite.

In a further embodiment, the oxidizing agent is an alkali metal bromate, and the alkali metal bromate is sodium bromate.

In one embodiment, the ammonium salt is at least one selected from the group consisting of ammonium chloride, ammonium bromide, ammonium iodide, ammonium sulfate, and ammonium carbonate.

In a further embodiment, the ammonium salt is ammonium chloride.

In one embodiment, the nitrite salt is at least one selected from the group consisting of sodium nitrite, potassium nitrite, and silver nitrite.

In a further embodiment, the nitrite salt is sodium nitrite.

In one embodiment, ammonium fluoride is present in an amount of 0.1-25 M, and the oxidizing agent is present in an amount of 0.0125 to 25 M, each relative to a combined volume of the acid generating and the heat generating components.

In one embodiment, the nitrite salt is present in an amount of 0.01-25 M, and the ammonium salt is present in an amount of 0.0025-100 M, each relative to a combined volume of the acid generating and the heat generating components.

In one embodiment, a total volume of the acid generating and the heat generating components injected is in a range of 0.1-30 pore volumes.

In one embodiment, the subterranean formation has a temperature of at least 60° C. prior to the injecting.

In one embodiment, the subterranean formation has a permeability of 0.1-1,000 millidarcy (mD) prior to the injecting.

In one embodiment, the subterranean formation is a sandstone formation.

In one embodiment, the wellbore is a horizontal wellbore, a vertical wellbore, or a multilateral wellbore.

In one embodiment, the injecting is performed in an intermittent fashion with a halt time of 0.1-1 hour.

In one embodiment, an amount of hydrogen fluoride formed is in a range of 0.02-1 wt % relative to a combined weight of the acid generating and the heat generating components.

In one embodiment, the permeability of the subterranean formation increases by at least 30% relative to that prior to the injecting.

According to a second aspect, the present disclosure relates to a two-component formation acidizing kit that involves (i) an acid generating component including a first container containing ammonium fluoride and a second container containing sodium bromate, and (ii) a heat generating component including a third container containing ammonium chloride and a fourth container containing sodium nitrite, wherein a molar ratio of ammonium fluoride to sodium bromate is in a range of 1:1 to 8:1, a molar ratio of ammonium chloride to sodium nitrite is in a range of 1:4 to 4:1, and a molar ratio of ammonium fluoride to sodium nitrite is in a range of 1:1 to 10:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
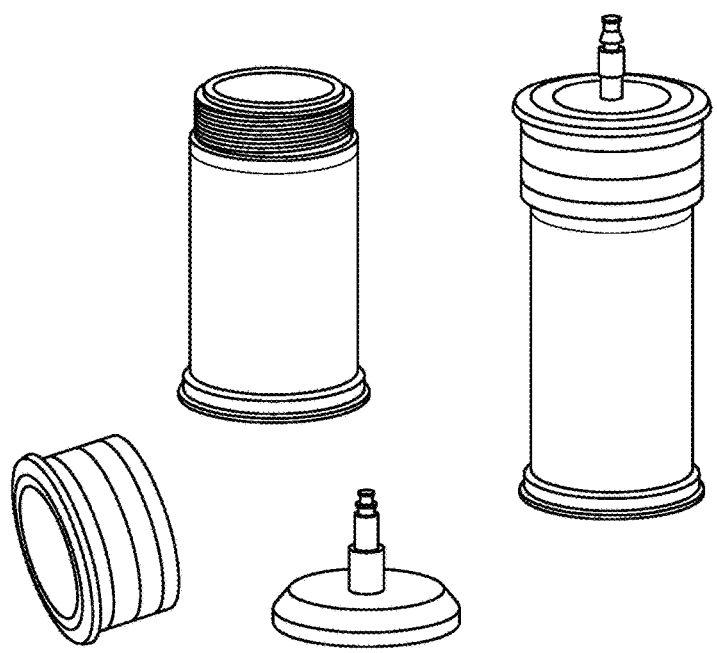
FIG. 1 shows the disassembled cell for core flooding test.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "salt", oxidizing agent", and "compound" are used interchangeably, and are intended to refer to a chemical entity, whether in the solid, liquid or gaseous phase, and whether in a crude mixture or purified and isolated.

According to a first aspect, the present disclosure relates to a method of acidizing a subterranean geologic formation (also referred to as "formation" in the present disclosure) surrounding a wellbore. The method involves injecting an acid generating component and a heat generating component simultaneously into the wellbore, wherein: (i) the acid generating component comprises a first aqueous solution comprising ammonium fluoride, and a second aqueous solution comprising an oxidizing agent, and (ii) the heat generating component comprises a third aqueous solution comprising an ammonium salt that is not ammonium fluoride, and a fourth aqueous solution comprising a nitrite salt. The ammonium salt reacts with the nitrite salt to release heat and nitrogen gas, and the heat initiates a reaction between ammonium fluoride and the oxidizing agent, thereby forming hydrogen fluoride (HF) within the subterranean formation. Preferably the method is carried out with generating or using HF outside the wellbore or outside the portion of the geologic formation targeted for acidizing.

In a preferred embodiment, the subterranean formation is a sandstone formation. A sandstone formation refers to a formation having predominantly quartz, feldspar, rock fragments, mica and numerous additional mineral grains held together with siliceous material. Alternatively, the subterranean formation may be a carbonate formation, a shale formation, or a clay formation. A carbonate formation refers to a formation having carbonate minerals, such as calcite, aragonite, dolomite, and so forth. Two major types of carbonate formations are limestone and dolomite formations. A shale formation refers to a fine-grained formation which may contain clay minerals and quartz. A clay formation may contain chlorite, illite, kaolinite, montmorillonite, and smectite.

The subterranean formation may be a heterogeneous formation. A heterogeneous formation refers to a formation whose physical properties vary with location. Alternatively, the subterranean formation may be a homogenous formation. A homogeneous formation refers to a formation whose physical properties do not vary from place to place in the wellbore.

The subterranean formation of the present disclosure may be a hydrocarbon-bearing reservoir. "Hydrocarbons", "petroleum", "crude oil", or "oil" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

Sandstone reservoirs have complex mineralogy, and often contain a mixture of carbonates, quartz, and aluminosilicates. Therefore, sandstone formations are commonly stimulated using hydrofluoric acid (HF) based systems, which include HF and optionally other strong mineral acids, organic acids, esters, and combinations thereof. HF acid is hazardous to handle because it is highly corrosive to tissue, wellbore tubulars and completion equipment. HF acid must be neutralized when returned to the wellbore surface. These challenges warrant need for a controlled acid system whereby HF acid is generated in-situ, released only downhole, and propagated deep into the reservoir to treat formation damage.

In one embodiment, the wellbore is a horizontal wellbore, a vertical wellbore, or a multilateral wellbore. A vertical wellbore is considered a conventional well which is formed by drilling horizontally down to a target. A horizontal wellbore refers to a wellbore that has a vertical section and a horizontal lateral section with an inclination angle (an angle between the vertical section and the horizontal lateral section) of at least 70°, or at least 80°, or in the range of 85° to 90°. The horizontal wellbore may enhance a reservoir performance due to an increased reservoir contact provided by the horizontal lateral section. As used here, a multilateral wellbore refers to a wellbore that has a main/central borehole and a plurality of laterals extend outwardly therefrom.

The term "acidizing" as used herein refers to a process that involves pumping/injecting pressurized fluids, e.g. the acid and heat generating components, to the subterranean formation through the wellbore to generate acid (e.g. HF) that dissolves sediments, removes formation residues and/or fragments that inhibit permeability, and/or forms wormholes, in order to enhance or restore a production rate of the formation. HF may be produced by the acid generating component with the assistance of the heat generating component.

The heat generating component used herein includes an ammonium salt that is not ammonium fluoride. Exemplary ammonium salts include, but are not limited to, ammonium chloride ($NH_4Cl$), ammonium bromide ($NH_4Br$), ammonium nitrate ($NH_4NO_3$), ammonium sulfate (($NH_4)_2SO_3$), ammonium carbonate (($NH_4)_2CO_3$), ammonium hydroxide ($NH_4OH$), ammonium iodide ($NH_4I$), diammonium phosphate, ammonium acetate, ammonium formate, and combinations thereof. In a preferred embodiment, the ammonium salt is at least one selected from the group consisting of ammonium chloride, ammonium bromide, ammonium iodide, ammonium sulfate, and ammonium carbonate. In a most preferred embodiment, the ammonium salt is ammonium chloride.

The heat generating component also includes a nitrite salt which may oxidize the ammonium salt and produce heat and nitrogen gas. In one or more embodiments, the nitrite salt is at least one selected from the group consisting of sodium nitrite, potassium nitrite, silver nitrite, and ammonium nitrite. In a preferred embodiment, the nitrite salt is sodium nitrite. It is equally envisaged that other oxidants such as hydrogen peroxide, alkali metal salts of hypochlorite (e.g. sodium hypochlorite), or combinations thereof may be used in addition to or in lieu of the nitrite salt.

In one embodiment, a molar ratio of ammonium ions present in the ammonium salt to the nitrite ions present in the nitrite salt is in a range of 1:4 to 4:1, preferably in a range of 1:3 to 3:1, preferably in a range of 1:2 to 2:1, preferably in a range of 2:3 to 3:2, or about 1:1. However, in certain embodiments, the molar ratio of ammonium ions present in the ammonium salt to the nitrite ions present in the nitrite salt is less than 1:4 or greater than 4:1.

In at least one embodiment, the ammonium salt is ammonium chloride, and the nitrite salt is sodium nitrite. As shown in Equation (B), the oxidation of ammonium chloride by sodium nitrite produces nitrogen gas and heat (ΔH is in a range of −300 to −380 kJ/mol, −320 to −350 kJ/mol, or about −350 kJ/mol) as well as sodium chloride and water as byproducts.

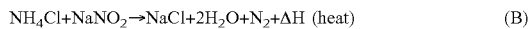

NH$_4$Cl+NaNO$_2$→NaCl+2H$_2$O+N$_2$+ΔH (heat)  (B)

The exothermic reaction of the ammonium and nitrite salts may accelerate at an acidic pH and/or with increased temperature. An acidic pH environment may be created using an inorganic or organic acid such as hydrochloric acid, formic acid, benzoic acid, acetic acid, phosphoric acid, hydrobromic acid, hydroiodic acid, nitric acid, sulfuric acid, and/or perchloric acid or some other acid. Preferably, hydrochloric acid (HCl) is used to initiate and/or accelerate the exothermic reaction. The acid (e.g. HCl) may be present in the heat generating component along with the ammonium and nitrite salts. Alternatively, the acid may be introduced during an acid pre-flushing step which is described hereinafter.

In some embodiments, a temperature within the subterranean formation that is greater than 50° C., preferably greater than 60° C., more preferably greater than 70° C. is sufficient to activate or co-activate the exothermic reaction of the ammonium and nitrite salts. In one embodiment, the subterranean formation of the present disclosure has a temperature of at least 60° C. prior to the injecting, preferably at least 70° C., preferably between 75 and 120° C., or about 90° C. prior to the injecting. In a preferred embodiment, the temperature of the subterranean formation prior to the injecting is at least 50° C., preferably at least 60° C., more preferably at least 70° C., the temperature at which the exothermic reaction is activated.

The heat generated from the exothermic reaction may increase downhole temperature of the subterranean formation by at least 100° C., preferably by 150-300° C., more preferably by 200-250° C. relative to that prior to the exothermic reaction occurs. The nitrogen gas formed from the exothermic reaction may increase pressure of the subterranean formation by at least 100 psi, preferably increase by 150-400 psi, more preferably increase by 200-300 psi relative to that prior to the exothermic reaction occurs.

The acid generating component includes ammonium fluoride (NH$_4$F) and an oxidizing agent. The oxidizing agent may be at least one selected from the group consisting of an alkali metal bromate (e.g. lithium bromate, sodium bromate, potassium bromate, cesium bromate, rubidium bromate), an alkali metal chlorate (e.g. lithium chlorate, sodium chlorate, potassium chlorate, cesium chlorate, rubidium chlorate), an alkali metal iodate (e.g. sodium iodate, potassium iodate, cesium iodate, rubidium iodate), an alkali metal bromite (e.g. sodium bromite, potassium bromite, cesium bromite), an alkali metal chlorite (e.g. sodium chlorite, potassium chlorite, cesium chlorite), an alkali metal hypochlorite (e.g. sodium hypochlorite, potassium hypochlorite), an alkali metal hypobromite (e.g. an alkali earth metal bromate (e.g. magnesium bromate, calcium bromate), an alkali earth metal chlorate (e.g. magnesium chlorate, calcium chlorate), an alkali earth metal iodate (e.g. calcium iodate), an alkali earth metal hypochlorite (e.g. calcium hypochlorite), and an alkali earth metal hypobromite (e.g. calcium hypobromite). In one or more embodiments, the oxidizing agent is an alkali metal bromate, an alkali metal bromite, an alkali metal hypobromite, or a combination thereof. In a preferred embodiment, the oxidizing agent is an alkali metal bromate. In a most preferred embodiment, the oxidizing agent is sodium bromate. In at least one embodiment, the aforementioned potassium salts (e.g. potassium bromate, potassium chlorate, potassium iodate, potassium bromite, potassium chlorite, potassium hypochlorite) are not used as the oxidizing agent due to their insufficient oxidizing strength.

In one embodiment, a molar ratio of ammonium fluoride to the oxidizing agent is in a range of 1:1 to 8:1, preferably in a range of 3:2 to 6:1, more preferably in a range of 5:3 to 3:1, or about 2:1.

The reaction of ammonium fluoride and the oxidizing agent may be endothermic with an activation temperature of at least 100° C., preferably 120-300° C., preferably 140-275° C., preferably 160-250° C., preferably 180-225° C., or about 200° C. As specified previously, the heat generated from reacting the ammonium and nitrite salts can raise the downhole temperature above the activation threshold level (e.g. 200° C.) and initiate the reaction between ammonium fluoride and the oxidizing agent, thereby forming hydrogen fluoride within the subterranean formation.

In one embodiment, a molar ratio of the ammonium fluoride present in the acid generating component to the nitrite salt present in the heat generating component is in a range of 1:1 to 10:1, preferably in a range of 3:2 to 7:1, more preferably 5:3 to 5:1, even more preferably 2:1 to 4:1, or about 2.67:1.

As shown in Equation (A), the oxidation of ammonium fluoride by the oxidizing agent (e.g. sodium bromate) consumes heat and generates hydrogen fluoride and nitrogen gas, as well as sodium bromide and water as byproducts. When a bromate species is used as an oxidant during the oxidation of ammonium fluoride, the oxidation state of the bromine atom may exist as any one of the possible oxidation states, including as bromate (+5), bromite (+3), hypobromite (+1), bromine (0), and bromide (−1) [Hull, K. L., Cairns, A. J., and Haq, M., Inorg. Chem. 2019, 58, 3007-3014, incorporated herein by reference in its entirety].

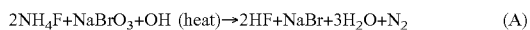

2NH$_4$F+NaBrO$_3$+OH (heat)→2HF+NaBr+3H$_2$O+N$_2$  (A)

The aforementioned compounds (i.e. ammonium fluoride, the oxidizing agent, the ammonium salt, or the nitrite salt) may be injected into the wellbore in the form of aqueous solutions. Any water containing solution, including saltwater, hard water, and/or fresh water may be used with the compounds to form the respective aqueous solutions. For purposes of this description, the term "saltwater" includes saltwater with a chloride ion content of between about 6,000 ppm and saturation, and is intended to encompass seawater and other types of saltwater including groundwater comprising additional impurities typically found therein. The term "hard water" includes water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Exemplary salts that may be present in saltwater, hard water, and/or fresh water include, but are not limited to, cations such as sodium, magnesium, calcium, potassium, ammonium, and iron, and anions such as chloride, bicarbonate, carbonate, sulfate, sulfite, phosphate, iodide, acetate, and citrate. The water or fluid used herein may be supplied from a natural source, such as an aquifer, a lake, a river, and/or an ocean, and may be filtered to remove large solids before being used in the acidizing process. In another embodiment, the water is produced water (byproduct of the oil industry). Alternatively, the water may be tap water, deionized water, or distilled water.

In one embodiment, ammonium fluoride is present in an amount of 0.1-25 M, preferably 0.5-20 M, preferably 1-15 M, preferably 1.25-10 M, preferably 1.5-8 M, preferably 2-6 M, preferably 2.5-4 M, or about 2.67 M relative to a combined volume of the acid generating and the heat generating components. In a related embodiment, the oxidizing agent is present in an amount of 0.0125 to 25 M, preferably 0.05-20 M, preferably 0.1-15 M, preferably 0.5-10 M, preferably 0.75-5 M, preferably 1-3 M, or about 1.33 M relative to a combined volume of the acid generating and the heat generating components.

In one embodiment, the nitrite salt is present in an amount of 0.01-25 M, preferably 0.05-20 M, preferably 0.1-15 M, preferably 0.25-10 M, preferably 0.5-5 M, preferably 0.75-2 M, or about 1 M relative to a combined volume of the acid generating and the heat generating components. In a related embodiment, the ammonium salt is present in an amount of 0.0025-100 M, preferably 0.005-50 M, preferably 0.01-25 M, preferably 0.1-20 M, preferably 0.25-10 M, preferably 0.5-5 M, preferably 0.75-2 M, or about 1 M relative to a combined volume of the acid generating and the heat generating components.

The formation acidizing method of the present disclosure involves injecting the acid generating component (i.e. aqueous solutions of ammonium fluoride and the oxidizing agent) and the heat generating component (i.e. aqueous solutions of the ammonium salt and the nitrite salt) simultaneously into the wellbore. The formation acidizing method may be a matrix acidizing or fracture acidizing stimulation process.

As used herein, injecting refers to a process whereby a fluid mixture (e.g. the acid and heat generating components) is transferred from a surface of a wellbore to a localized section within the wellbore, followed by inserting the acid generated (e.g. HF) to the formation surrounding the localized section within the wellbore. In one embodiment, the injecting is carried out with a pressure below a fracture pressure of the subterranean formation to enable the acid generated (e.g. HF) to penetrate the subterranean formation, dissolve sediments and mud solids and remove formation damages that may be inhibiting the permeability of the formation (i.e. matrix acidizing). Injection pressure in matrix acidizing may be in a range of 1-30 psi, preferably 5-25 psi, preferably 15-20 psi.

In another embodiment, the injecting may be carried out with a pressure above the fracture pressure of the subterranean formation to induce fractures in the subterranean formation by the stimulation fluid, followed by etching open faces of the induced fractures (i.e. acid fracturing). When acid fracturing is completed and the induced fractures are closed, etched faces may provide a greater permeability recovery. Injection pressure in acid fracturing may be in the range of 20-100 psi, preferably 20-70 psi, preferably 20-50 psi, preferably 20-40 psi.

As used herein, the term "pore volume" or "PV" refers to the total volume in a formation/reservoir that can be occupied by fluids.

The injecting may be performed at various flow rates and injection volumes, depending on the injecting pressure and a total volume of the formation, etc. For example, in some embodiments, the injecting is performed at a flow rate of 1-1,000 L/min, preferably 20-800 L/min, preferably 50-500 L/min, preferably 100-300 L/min. In one embodiment, a total volume of the acid generating and the heat generating components injected is in a range of 0.1-30 pore volumes (PVs), preferably 0.2-20 pore volumes, preferably 0.4-15 pore volumes, preferably 0.6-10 pore volumes, preferably 0.8-5 pore volumes, preferably 1-4 pore volumes, preferably 2-3 pore volumes. In another embodiment, a total volume of the acid and the heat generating components injected is at least 1,000 liter (L), at least 10,000 L, at least 20,000 L, at least 30,000 L, at least 40,000 L, at least 50,000 L, or at least 100,000 L, relative to a length of the wellbore which may be at least 10 m, at least 100 m, at least 200 m, at least 300 m, at least 400 m, at least 500 m, or at least 1,000 m. The amount of each component injected per linear foot of the targeted portion of the geologic formation may range from 1-500 L, preferably 5-400 L, 10-300 L, 25-200 L, or 50-100 L.

The injecting may be performed in a continuous or intermittent fashion. In one embodiment, the injecting is performed in a continuous fashion, and a duration of the process may be no longer than 6 hours, preferably ranging from 0.5 to 4 hours, preferably ranging from 1 to 3 hours, preferably ranging from 1.5 to 2 hours. Preferably, the injecting is performed in an intermittent fashion with at least 2 cycles, preferably at least 3 cycles, preferably at least 5 cycles of the injecting followed by a halt time of 0.1-24 hour, preferably 0.5-12 hours, preferably 1-6 hours, preferably 2-3 hours. As used herein, the term "halt time" refers to the duration between two consecutive injections. The halt time allows HF generated from the prior injection to react with the formation before commencing the next injection.

Transferring/injecting fluid mixture is performed through a tube or a pipe. In one embodiment, injecting may be carried out by disposing a nozzle on one end of a tube or a pipe that transfers the acid and heat generating components to a downhole of the wellbore. Said nozzle may have various shapes and geometries, as known to those of ordinary skill in the art. For example, the nozzle may be a perforated tube with a capped end and perforations circumferentially oriented along the perforated tube to create a radial flow of the acid and heat generating components. In certain embodiments, the injecting is performed using coiled tubing, which is located inside the wellbore to selectively acidize certain spots in the wellbore.

The acid and heat generating components are injected simultaneously into the wellbore. In one embodiment, a fluid mixture containing the acid and heat generating components is injected into the wellbore via a single tube. In a preferred embodiment, the acid and heat generating components are not mixed and injected individually into a targeted location of the wellbore. In another preferred embodiment, the first aqueous solution containing ammonium fluoride, the second aqueous solution containing the oxidizing agent, the third aqueous solution containing the ammonium salt, and the fourth aqueous solution containing the nitrite salt are not mixed and injected individually into the targeted location of the wellbore. These separations may prevent premature formation of HF before the components/compounds reach the targeted location of the wellbore.

In one embodiment, an amount of hydrogen fluoride (i.e. hydrofluoric acid, HF) generated in the method disclosed herein is in a range of 0.02-1 wt % relative to a combined weight of the acid generating and the heat generating components, preferably 0.04-0.8 wt %, preferably 0.06-0.6 wt %, preferably 0.08-0.4 wt %, preferably 0.1-0.3 wt %, preferably 0.12-0.25 wt %, preferably 0.14-0.2 wt %, preferably 0.16-0.18 wt % relative to the combined weight of the acid generating and the heat generating components. The amount of HF generated is dependent on many factors including concentrations of aforementioned compounds (i.e.

ammonium fluoride, the oxidizing agent, the ammonium salt, and the nitrite salt), as well as pH level, temperature, and pressure of the formation being treated, etc. Accordingly, in certain embodiments, the amount of HF generated is less than 0.02 wt % or greater than 1 wt % relative to a combined weight of the acid generating and the heat generating components.

Depending on the type of the subterranean formation, different acids may be required to effectively restore or enhance the production rate of the formation. For example, hydrochloric acid (HCl), acetic acid, and/or formic acid may be used to acidize a carbonate formation and dissolve a portion of the formation. In sandstone formations, an acidizing process often involves the use of hydrogen fluoride (HF) in combination with HCl. A blend of HF and HCl mixed at effective ratios can dissolve fine sand (quartz), feldspar, and clay particles frequently found in sandstone formations, and thus eliminate pore blockage and/or enlarge pore spaces within the formation.

In one or more embodiments, the method of the present disclosure in any of its embodiments further involves flushing an aqueous solution comprising an acid into the wellbore prior to the injecting. The acid solution used in the pre-flushing step may lower the pH of the wellbore/formation, which can trigger and/or accelerate the exothermic reaction of heat generating component (i.e. the ammonium and nitrite salts). The acid solution used in the pre-flushing may further be intended to react with calcite and other carbonate materials in the formation, and thus alleviate undesirable dissipation of the hydrogen fluoride generated at a later stage of the process. The acid solution may also be intended to break down the perforations in the casing and thereby establish good communication between the wellbore and the formation. A duration of the pre-flushing may be no longer than 3 hours, preferably ranging from 0.25 to 2 hours, preferably ranging from 0.5 to 1 hours.

In a preferred embodiment, the acid is hydrochloric acid (HCl). In a related embodiment, the volume ratio of hydrochloric acid used in the pre-flushing step to hydrofluoric acid generated by the method as previously discussed may be in a range of 1:2 to 10:1, 1:1 to 8:1, 2:1 to 6:1, or 4:1 to 5:1. In one embodiment, the acid may be present in the solution used for pre-flushing in any suitable amount. For example, the acid may be present in an amount of 0.5 to 40 wt % relative to a total weight of the solution, preferably 1-30 wt %, preferably 5-25 wt %, preferably 8-20 wt %, preferably 10-15 wt % relative to a total weight of the solution.

It is equally envisaged that other mineral acids such as nitric acid, sulfuric acid, phosphoric acid, perchloric acid, hydrobromic acid, hydroiodic acid, and boric acid as well as organic acids such as formic acid, acetic acid, propionic acid, butyric acid, valeric acid, caproic acid, oxalic acid, lactic acid, malic acid, citric acid, carbonic acid, benzoic acid, phenolic acid, and uric acid may be used in addition to or in lieu of hydrochloric acid in the pre-flushing step.

In some embodiments, the method of the present disclosure in any of its embodiments further involves introducing a corrosion inhibitor into the wellbore prior to and/or during the acidizing process. The corrosion of metallic equipment may be increased if it comes into contact with acids (e.g. HF, HCl). Exemplary corrosion inhibitors include, but are not limited to, 1H-benzotriazole, 2-aminobenzimidazole, 2-mercaptobenzimidazole, indole, cinnamaldehyde, 4-methylpiperidine, 1,2-diaminopropane, dibutylamine, diethylhydroxylamine, dimethylethanolamine, 3,5-dinitrobenzoic acid, hydrazine, aluminum bisulfate, iron oxides, zinc oxide, zinc carbonate, barium borate, and zinc borate. The corrosion inhibitor may be introduced in an amount of 0.01-2 vol % relative to a combined volume of the acid and the heat generating components, preferably 0.05-1.5 vol %, preferably 0.1-1 vol %, preferably 0.2-0.7 vol %, preferably 0.3-0.5 vol % relative to the combined volume of the acid and the heat generating components.

Permeability of a formation refers to a measure of the formation's ability to transport/transfer fluids. In one embodiment, the subterranean formation has a permeability of 0.1-1,000 millidarcy (mD) prior to the injecting, preferably 1-800 mD, preferably 5-600 mD, preferably 10-400 mD, preferably 25-200 mD, preferably 50-100 mD. In one embodiment, the subterranean formation may be a conventional reservoir (e.g. the Gray Berea sandstone) with a permeability of 100-200 mD, preferably 120-180 mD, preferably 130-170 mD, preferably 140-160 mD. In another embodiment, the subterranean formation may be an unconventional reservoir (e.g. the Scioto sandstone) with a permeability of less than 10 mD, preferably 0.5-9 mD, preferably 1-7 mD, preferably 3-5 mD.

Figure 5:
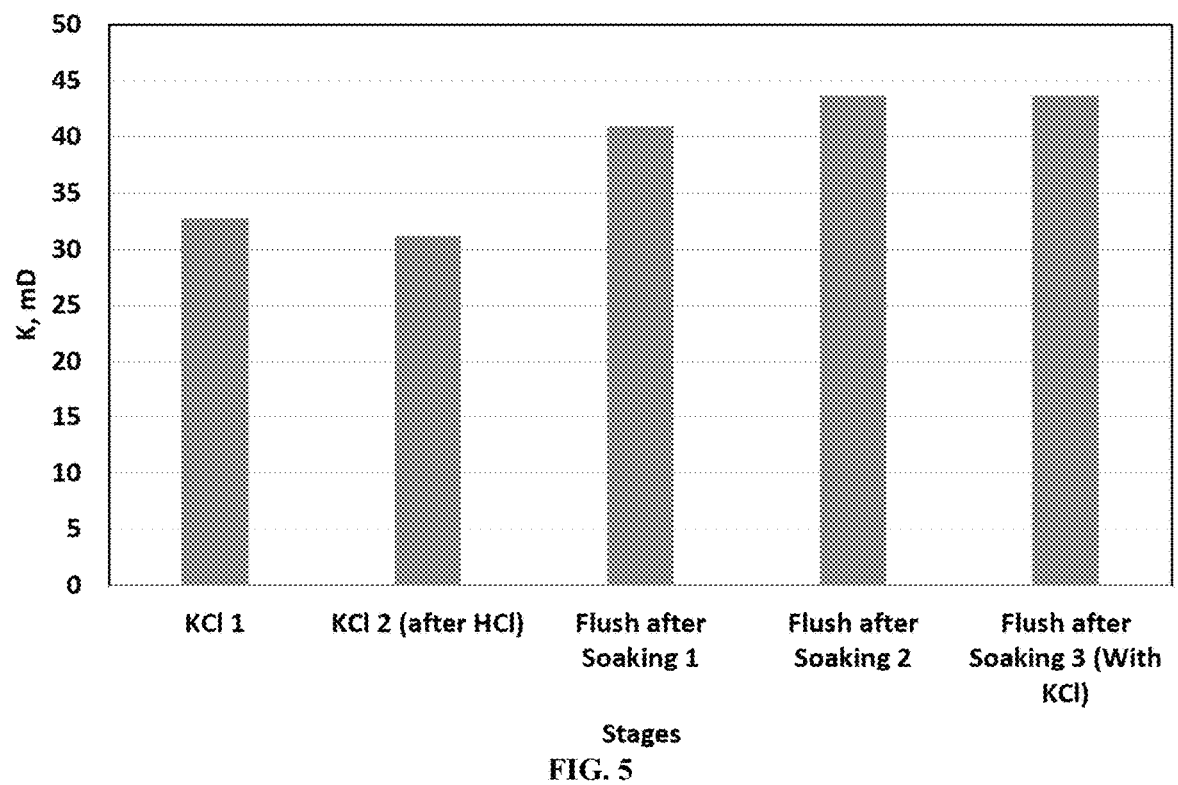
FIG. 5 is a bar graph showing permeability of a sandstone sample before (KCl 1) and after sequential treatment with HCl flushing (KCl 2) and a three-cycle acidizing process with 30 min intermittent soakings (i.e. halt time).
Figure 6:
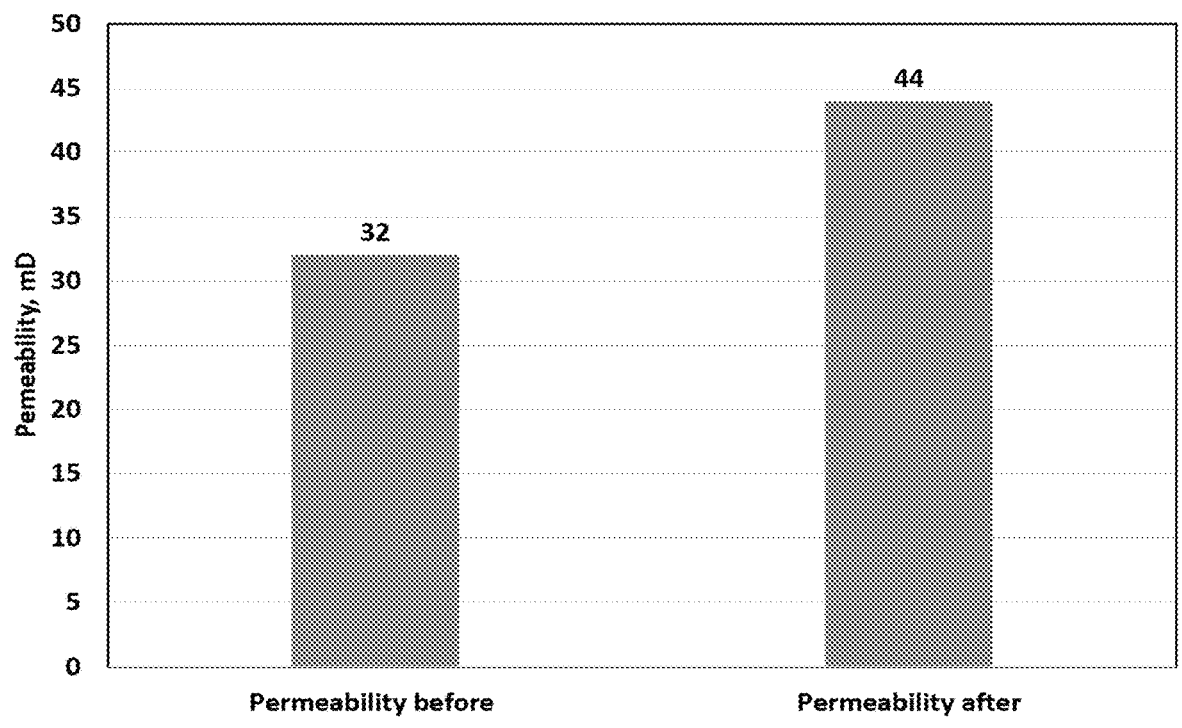
FIG. 6 is a bar graph showing permeability of a sandstone sample before and after the acidizing process.

In one or more embodiments, the permeability of the subterranean formation increases by at least 30% relative to that prior to the injecting, preferably by 35-80%, preferably by 40-75%, preferably by 45-70%, preferably 50-65%, preferably 55-60% relative to that prior to the injecting (see FIGS. 5 and 6).

The hydrogen fluoride generated by the method disclosed herein may be chemically consumed and neutralized when it contacts the formation. Other unreacted components (e.g. water, salts byproducts) produced by the acid and heat generating components may form an essentially neutral spent fluid, which can be recovered, recycled, and/or safely disposed of. The nitrogen gas formed by the exothermic reaction (Equation B) and acid generating reaction (Equation A) can increase hydrostatic pressure of the subterranean formation. The hydrostatic pressure may cause existing wellbore fluids (e.g. the spent fluid) to flow backward to the surface of the wellbore. After the spent fluid is flowed back to the surface after the acidizing process, oil production may commence or recommence. If the oil production rate starts to decline, the formation acidizing process may be repeated.

According to a further aspect, the present disclosure relates to a multi-component formation acidizing kit, preferably involving at least an acid generating component and a heat generating component. The acid generating component includes a first container containing ammonium fluoride and a second container containing an oxidizing agent such as sodium bromate. The heat generating component includes a third container containing an ammonium salt such as ammonium chloride and a fourth container containing a nitrite salt such as sodium nitrite. The compounds in each container of the kit may be dissolved in a solvent (e.g. water) separately to form respective aqueous solutions (i.e. the first, second, third, and fourth solutions). These solutions may be injected simultaneously to a wellbore for formation acidizing treatment as specified previously.

Containers are used herein to include any of drums, barrels, intermediate bulk containers (IBCs), totes, bins, bulk containers, tank trucks and railcars.

The chemical composition and relative molar ratio among each of the compounds of the formation acidizing kit may be substantially similar to those described previously. For example, a molar ratio of ammonium fluoride to the oxidizing agent (e.g. sodium bromate) is in a range of 1:1 to 8:1, preferably in a range of 3:2 to 6:1, more preferably in a range of 5:3 to 3:1, or about 2:1, a molar ratio of ammonium ions present in the ammonium salt (e.g. ammonium chloride) to the nitrite ions present in the nitrite salt (e.g. sodium nitrite) is in a range of 1:4 to 4:1, preferably in a range of 1:3 to 3:1, preferably in a range of 1:2 to 2:1, preferably in a range of 2:3 to 3:2, or about 1:1, and a molar ratio of ammonium fluoride to the nitrite salt (e.g. sodium nitrite) is in a range of 1:1 to 10:1, preferably in a range of 3:2 to 7:1, more preferably in a range of 5:3 to 5:1, even more preferably in a range of 2:1 to 4:1, or about 2.67:1.

The examples below are intended to further illustrate protocols for executing and evaluating the formation acidizing method, and are not intended to limit the scope of the claims.

Example 1

Mechanism Discussion

The present disclosure provides a method for acidizing sandstone formations using hydrofluoric acid (HF) generated in-situ via thermochemical reactions. The proposed reaction that generates hydrofluoric acid is endothermic and requires a specific amount of heat to initiate. The heat generated by the aid of thermochemical reactions initiates the reaction for the production of hydrofluoric acid. The proposed reactions are described in Eqs. (A) and (B):

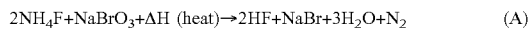
$$2NH_4F + NaBrO_3 + \Delta H \text{ (heat)} \rightarrow 2HF + NaBr + 3H_2O + N_2 \quad (A)$$

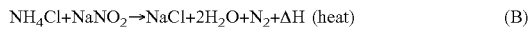
$$NH_4Cl + NaNO_2 \rightarrow NaCl + 2H_2O + N_2 + \Delta H \text{ (heat)} \quad (B)$$

This technique allows control of the amount of the generated hydrofluoric acid by controlling the stoichiometry of the thermochemical reaction. In addition, the time needed for the thermochemical reactions to proceed allows the reagents of reaction (A) that produces hydrofluoric acid to penetrate deep into the reservoir. The temperature near wellbore area increases due to the exothermic reactions. This may facilitate the removal of scale and/or deposits around the wellbore. The produced nitrogen gas increases the pressure around the reaction area. The nitrogen gas generated may be useful in helping the well to flow back and preventing reaction byproducts from precipitation.

Example 2

Methodology

An acid precursor, namely ammonium fluoride ($NH_4F$), and a suitable oxidizer, e.g. sodium bromates ($NaBrO_3$), are injected into the reservoir accompanied by an exothermic reaction as described by equation (B).

The reaction (A) generates hydrofluoric acid (HF) in-situ. However, the reaction is endothermic and requires heating at least up to 300° F. to take place. The exothermic reaction, Eq. (B), can generate in-situ heat that enables reaction (A) to take place and thus produce HF. The thermochemical reaction can be triggered by the formation temperature. The pressure and temperature generated depend on the concentration of reactants and volume of the system.

The HF generated in-situ may be used to dissolve quartz and different types of clay. A weighed amount of quartz was dispersed in the acid-generating medium which was contained in a sealed Teflon bottle and stirred for a given period of time. The system temperature was raised to the initiation temperature of the exothermic reaction. The system was sealed and isolated for 24 hours before the final weight of the quartz sample was measured. The concentration of Silicon in the solution was measured to quantify the concentration of generated HF. Inductively Coupled Plasma (ICP-OES) was used to analyze silicon concentration of the fluid samples.

Linear core flooding experiment was designed and carried out to study the ability of the in-situ generated acid to stimulate sandstone samples at high pressure and high temperature (HPHT) conditions. The HPHT cell was used to accommodate the HPHT conditions of the reaction. The initial permeability of the sample was measured using 3 wt % KCl solution. A hydrochloric acid (HCl) pre-flush was then injected through the core to remove any carbonate-based minerals. The core permeability was measured for the second time before the main flush stage. In the main flush stage, the thermochemical reactants were weighted based on the required thermal energy and mixed together in one injection cell. The acid precursor (ammonium fluoride ($NH_4F$)), and the strong oxidizer (sodium bromates ($NaBrO_3$)) were individually kept in two different cells.

All the reactants were injected simultaneously. Once the core was saturated with the reaction mixture, the system temperature was raised to the initiation temperature of reaction (B), which is around 90° C. A 30-minute soaking process was allowed for the reactions to take place. The pressure and temperature inside the core were monitored during the soaking period using pressure and temperature sensors. After initial soaking, the core was flushed again by 1 pore volume (PV) of the same mixture and the effluent was collected. The outlet and inlet valves maintained closed and the sample was exposed to another 30-minute soaking. Then the same procedures were followed. This was repeated for three successive times and the effluent after each time was collected for ICP analysis. Finally, the core was flowed back by a solution of 3 wt % KCl for the measurement of final permeability.

Example 3

Experimental Details

Aging cell with teflon liner was used to accommodate the quartz samples that were exposed to the exothermic reaction along with the reaction that generates hydrofluoric acid (HF). The cell was designed to tolerate the high pressure and high temperature resulted from the chemical reactions (see FIG. 1).

Figure 2:
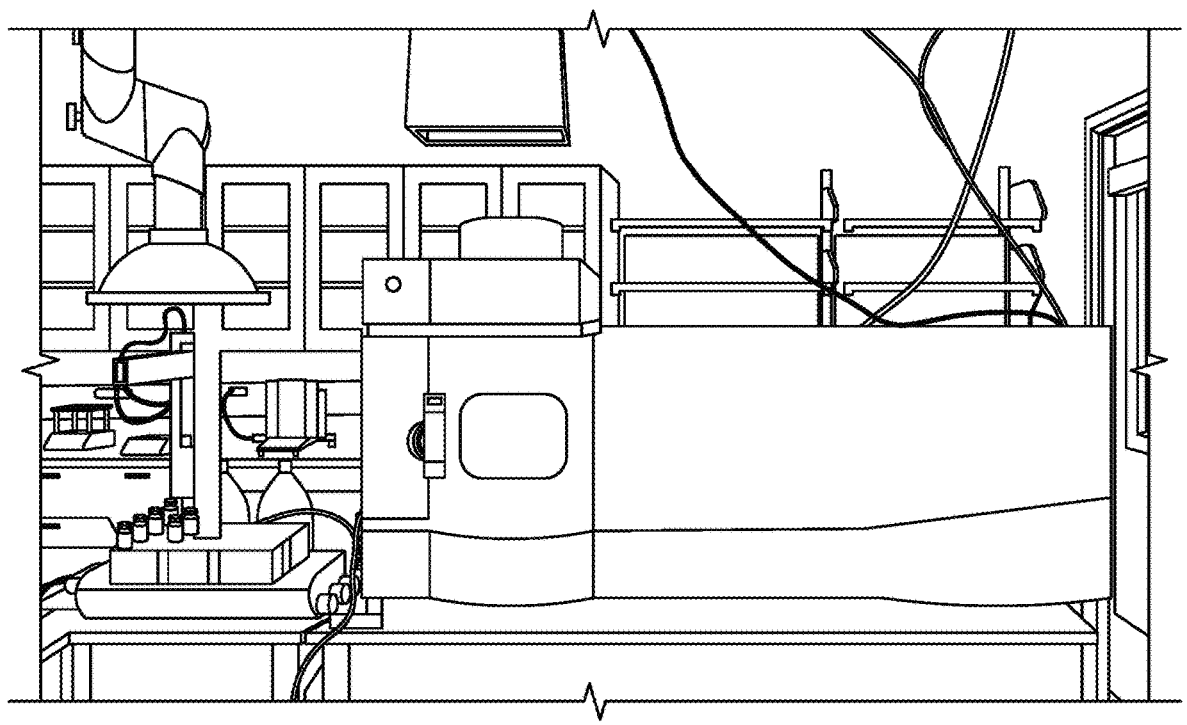
FIG. 2 is a picture of inductively coupled plasma optical emission spectrometry (ICP-OES) instrumentation.
Figure 3:
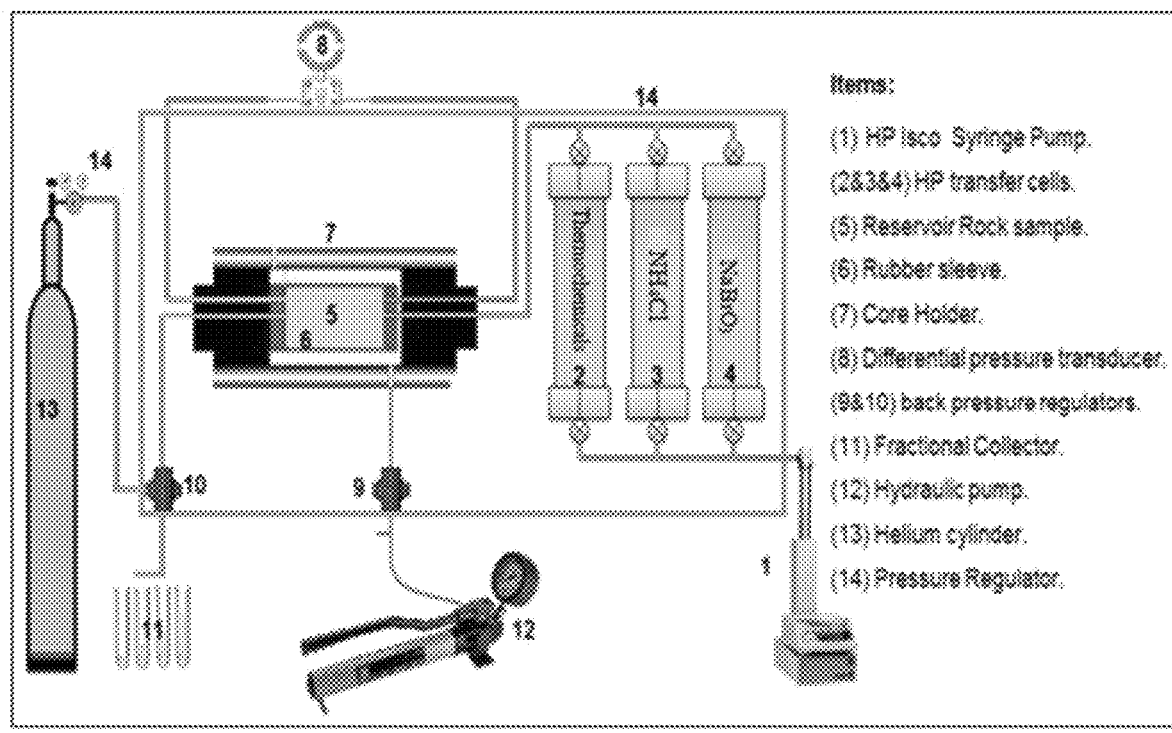
FIG. 3 is a schematic illustration showing the core flooding unit.

Inductively Coupled Plasma (ICP-OES) was used to determine the concentration of the silicon ions the effluent samples (see FIG. 2). The amount of hydrofluoric acid (HF) generated can be calculated based on the silicon concentration.

Digital balance was used to weigh all chemicals and materials involved in the current work.

Oven was used to raise the system temperature to the initiation temperature of the thermochemical reaction.

Temperature and pressure sensors were installed to measure the temperature and pressure of the system.

Example 4

Results and Discussions

Figure 4A:
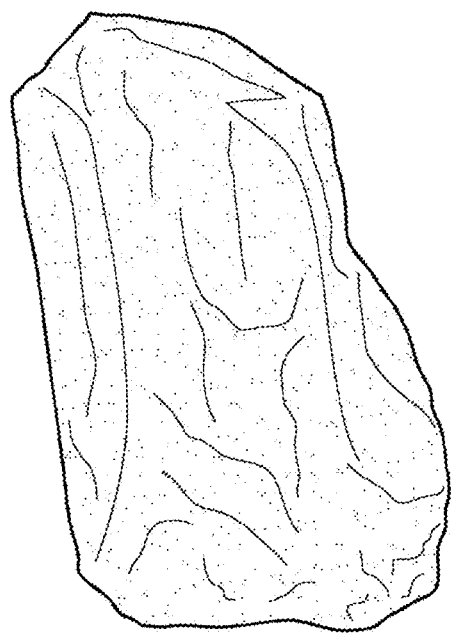
FIG. 4A is a picture of a quartz sample prior to the acidizing process.
Figure 4B:
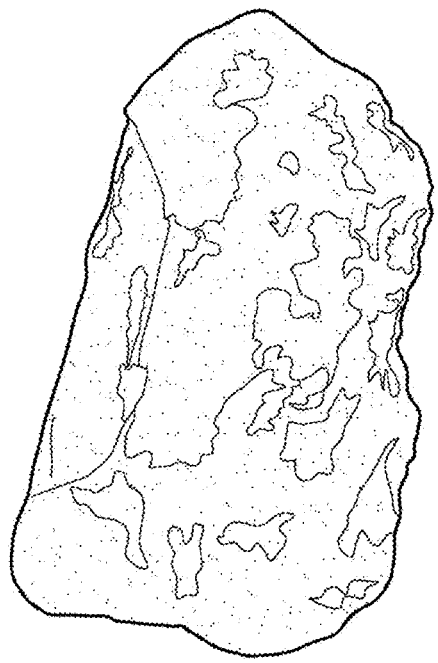
FIG. 4B is a picture of the quartz sample of FIG. 4A after being subjected to the acidizing process.

After soaking the quartz samples with all the chemical reactants listed in Eqs. (A) and (B) in the aging cell for 24 hours, the weight of the quartz sample was observed to change from 3.4040 g to 3.3235 g along with some notches on the surface of the quartz sample (see FIGS. 4A and 4B). This reduction in the quartz weight by 0.0805 g indicated the formation of HF acid and dissolution of the silica minerals by the HF.

The ICP results of the final solution show silicon ion (Sit) concentration of 91.43 ppm (i.e. 0.009143 wt %). The silicon ion (Sit) concentration level corresponded to HF acid concentration of 0.0384 wt %. These results show that HF generation formed by reacting ammonium fluoride (NH$_4$F) as an acid precursor with a strong oxidizer such as sodium bromates (NaBrO$_3$), occurs in the presence of the exothermic reaction (B). In addition to the heat, nitrogen gas (N$_2$) is another desirable product generated by the exothermic reaction. The nitrogen gas may increase the system pressure by about 200 psi.

The core flooding results showed a gradual enhancement in sample permeability of the Gray Berea sandstone with a maximum enhancement of 33.33% after the 2$^{nd}$ and the 3$^{rd}$ soaking stages by the chemical mixtures (see FIG. 5). Permeability of the initial sample was 32.78 mD as measured by 3 wt % KCl solution. After flushing the core with 7 wt % HCl, the core permeability was reduced to 31.22 mD, indicating the effect of the reaction of HCl with the clay minerals on the core. However, there was an immediate enhancement in the core permeability to up to 40.97 mD after the 1$^{st}$ core soaking stage with the main chemicals. The permeability went up to 43.70 mD after the 2$^{nd}$ soaking stage. Nevertheless, there was no noticeable change in the core permeability after the final stage soaking. This indicated that the dissolution of silica minerals as well as clay minerals in the Gray Berea sandstone core was accomplished by the in-situ generated HF acid.

Figure 7:
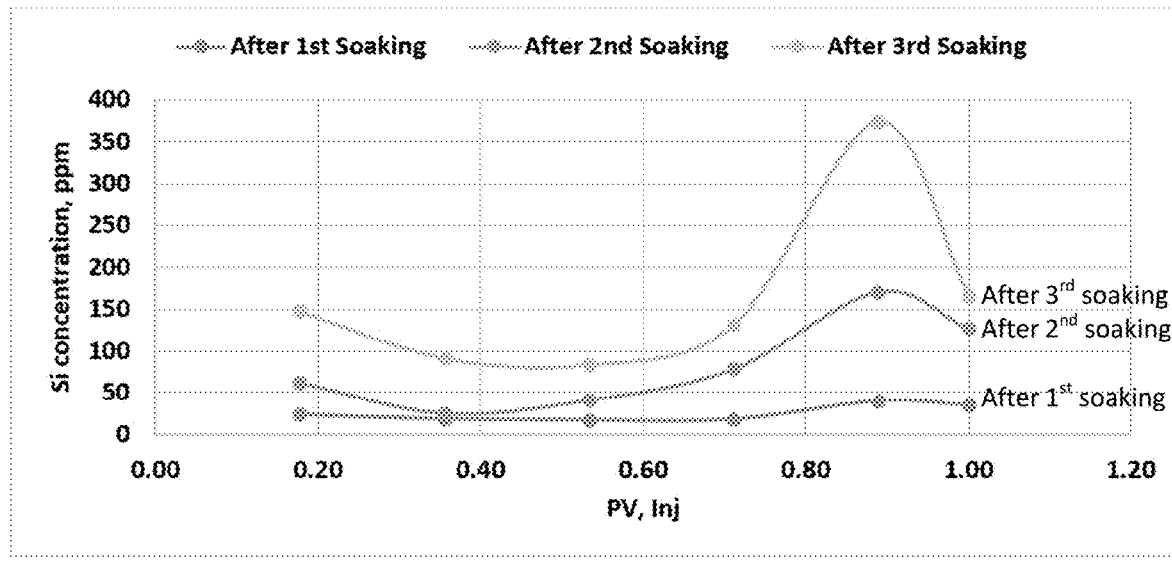
FIG. 7 is an overlay of silicon concentrations in core flooding effluent after each cycle of injecting at various injection volumes followed by soaking of 30 min.
Figure 8:
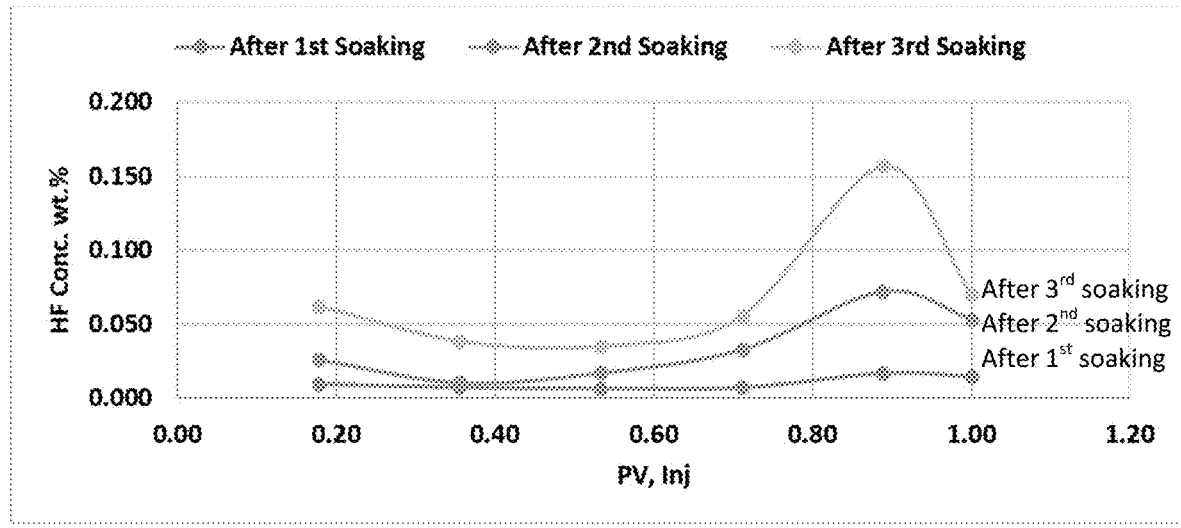
FIG. 8 is an overlay of hydrofluoric acid concentrations in core flooding effluent after each cycle of injecting at various injection volumes followed by soaking of 30 min.

To assess the amount of Si$^+$ ions dissolved from the core, the core flooding effluents after each stage were collected and analyzed using ICP measurement. All effluent samples showed the presence of Si$^+$ with different concentrations. The following chart (FIG. 7) shows the concentrations of Si$^+$ in ppm after each soaking stage. The corresponding concentration of HF acid generated was calculated and represented in wt % in FIG. 8. From these graphs, one could notice that the amount of dissolved Si ions increased after each soaking stage and reached its maximum value of 350 ppm after the 3$^{rd}$ soaking stage. Accordingly, the HF concentration, which was proportional to the Si ion concentration, reached a maximum value of 0.16 wt % after the 3$^{rd}$ soaking stage.

The present disclosure relates to an approach of generating hydrofluoric acid in-situ in the formation to avoid direct handling of hazardous acid. An acid precursor will react with a suitable oxidizer in the presence of an exothermic reaction to generate HF in the wellbore. Specifically, the method required an acid precursor which is ammonium chloride (NH$_4$Cl) that reacts with a strong oxidizer, e.g. sodium bromates (NaBrO$_3$). Due to endothermic nature of the reaction, an exothermic reaction was included to generate the required heat for the formation of HF acid. In addition to the heat generation, the exothermic reaction also produced high pressure that would help the well to flow back easily, prevent or remove precipitate.

The currently disclosed chemical mixture demonstrated its efficiency in generating HF and thus dissolving siliceous materials in sandstone samples. This technique is beneficial as it not only useful in removing the damage of sandstone formations but also enhancing their permeability. The core flooding experiment showed a huge enhancement in the permeability of Gray Berea sandstone core by 33.33% after treatment with the disclosed chemical mixture.

This present disclosure overcomes some of the persisting problems associated with sandstone stimulation. The in-situ generation of HF is fully controllable by adjusting the concentration of the chemical mixture. This would be helpful in reducing the amount of extra acid. In addition, a controlled formation of HF could reduce the reaction velocity and drive the acid deep into the formation. The application of the currently disclosed stimulation technology may help sandstone reservoirs to achieve great production potential, minimize corrosion, and avoid handling of hazardous chemicals (e.g. HF).

The invention claimed is:

1. A method of acidizing a subterranean sandstone formation surrounding a wellbore, the method comprising:
first flushing the wellbore with an HCl solution to remove carbonate minerals, then
injecting an acid generating component and a heat generating component simultaneously into the wellbore through a single tubing to a targeted location in the wellbore, wherein a temperature of the subterranean sandstone formation at the targeted location is from 50° C. to 60° C., wherein the tubing is terminated with a nozzle to create a radial flow of the acid generating component and the heat generating component inside the wellbore and contact the subterranean sandstone formation at the targeted location,
wherein:
the acid generating component comprises a first aqueous solution comprising ammonium fluoride, and a second aqueous solution comprising an alkali metal bromate;
the heat generating component comprises a third aqueous solution comprising an ammonium salt that is not ammonium fluoride, and a fourth aqueous solution comprising sodium nitrite;
a molar ratio of ammonium fluoride to the alkali metal bromate is in a range of 1:1 to 8:1;
a molar ratio of ammonium ions present in the ammonium salt to the nitrite ions present in the sodium nitrite is in a range of 1:4 to 4:1; and
a molar ratio of the ammonium fluoride to the sodium nitrite is in a range of 1:1 to 10:1,
whereby the ammonium salt reacts with the sodium nitrite to release heat and nitrogen gas, and the heat initiates a reaction between the ammonium fluoride and the alkali metal bromate thereby forming hydrogen fluoride within the subterranean sandstone formation, and
flowing fluids back to a surface with hydrostatic pressure formed by the release of the nitrogen gas.

2. The method of claim 1, wherein the ammonium salt is at least one selected from the group consisting of ammonium chloride, ammonium bromide, ammonium iodide, ammonium sulfate, and ammonium carbonate.

3. The method of claim 2, wherein the ammonium salt is ammonium chloride.

4. The method of claim 1, wherein ammonium fluoride is present in an amount of 0.1-25 M, and the oxidizing agent is present in an amount of 0.0125 to 25 M, each relative to a combined volume of the acid generating and the heat generating components.

5. The method of claim 1, wherein the sodium nitrite is present in an amount of 0.01-25 M, and the ammonium salt is present in an amount of 0.0025-100 M, each relative to a combined volume of the acid generating and the heat generating components.

6. The method of claim 1, wherein a combined volume of the acid generating and the heat generating components injected is in a range of 0.1-30 pore volumes.

7. The method of claim 1, wherein the subterranean sandstone formation has a permeability of 0.1-1,000 millidarcy (mD) prior to the injecting.

8. The method of claim 1, wherein the wellbore is a horizontal wellbore, a vertical wellbore, or a multilateral wellbore.

9. The method of claim 1, wherein the injecting is performed in an intermittent fashion with a halt time of 0.1-24 hours.

10. The method of claim 1, wherein an amount of hydrofluoric acid formed is in a range of 0.02-1 wt % relative to a combined weight of the acid generating and the heat generating components.

11. The method of claim 1, wherein the permeability of the subterranean sandstone formation increases by at least 30% relative to that prior to the injecting.

\* \* \* \* \*